United States Patent [19]
Rhodes et al.

[11] Patent Number: 5,458,792
[45] Date of Patent: Oct. 17, 1995

[54] ASYMMETRIC TRIBLOCK COPOLYMER VISCOSITY INDEX IMPROVER FOR OIL COMPOSITIONS

[75] Inventors: Robert B. Rhodes; Craig A. Stevens, both of Houston, Tex.

[73] Assignee: Shell Oil Company, Houston, Tex.

[21] Appl. No.: 289,487

[22] Filed: Aug. 11, 1994

[51] Int. Cl.[6] .................... C10M 143/12; C08F 293/00; C08F 295/00; C08F 297/00
[52] U.S. Cl. ................ 252/43; 525/314; 585/11
[58] Field of Search .............. 252/43; 525/314; 585/11

[56] References Cited

U.S. PATENT DOCUMENTS

| | | |
|---|---|---|
| 3,772,196 | 11/1973 | St. Clair et al. . |
| 3,775,329 | 11/1973 | Eckert . |
| 4,194,057 | 3/1980 | Brankling et al. ............ 585/11 |
| 4,788,361 | 11/1988 | Olson et al. . |
| 5,296,547 | 3/1994 | Nestegard et al. ............ 525/314 |
| 5,393,787 | 2/1995 | Nestegard et al. ............ 525/314 |

*Primary Examiner*—Jerry D. Johnson
*Attorney, Agent, or Firm*—Keith M. Tackett

[57] ABSTRACT

The present invention includes asymmetric triblock copolymers which are used as viscosity index improvers in oil compositions formulated for high performance engines. The triblock copolymers have the block structure hydrogenated polyisoprene-polystyrene-hydrogenated polyisoprene wherein the ratio of the number average molecular weights of the first and second hydrogenated polyisoprene blocks is at least 4.

10 Claims, No Drawings

ASYMMETRIC TRIBLOCK COPOLYMER VISCOSITY INDEX IMPROVER FOR OIL COMPOSITIONS

BACKGROUND OF THE INVENTION

This invention relates to polymeric additives for oil compositions, more particularly, to linear polymers of styrene and hydrogenated isoprene used as viscosity index improvers.

The viscosity of lubricating oils varies with temperature. In general, oils are identified by a viscosity index which is a function of the oil kinematic viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature specified in the test is 100° C. For two engine lubricants with the same kinematic viscosity at 100° C., the one having the lower kinematic viscosity at 40° C. will have the higher viscosity index. The oil with the higher viscosity index undergoes less kinematic viscosity change between the temperatures of 40° C. and 100° C. In general, viscosity index improvers that are added to engine oils increase the viscosity index as well as the kinematic viscosities.

The SAE Standard J300 viscosity classification system does not specify the use of viscosity index to classify multigrade oils. At one time, however, the Standard did require that certain grades meet low-temperature viscosities that were extrapolated from kinematic viscosity measurements taken at higher temperatures, for it was recognized that oils that were exceedingly viscous at low-temperatures caused engine starting difficulties in cold weather. For this reason, multigrade oils which possessed high viscosity index values were favored; these oils gave the lowest low-temperature extrapolated viscosities. Since then, ASTM has developed the cold cranking simulator (CCS), ASTM D5293, a moderately high-shear-rate viscometer which correlates with engine cranking speed at low temperatures, and today cranking viscosity limits, determined by the CCS, are defined in the SAE J300 Standard.

Today, it is also recognized that cranking viscosity is not sufficient to fully estimate a lubricant's low-temperature performance in engines. SAE J300 also requires that a pumping viscosity be determined in a low-shear-rate viscometer called the mini-rotary viscometer (MRV). This instrument can be used to measure viscosity and gel formation, the latter by the measurement of yield stress. In this test, an oil is slowly cooled over a two-day period to a specified temperature before viscosity and yield stress are determined. A yield stress observation constitutes an automatic failure in this test, while pumping viscosity must be below a specified limit to ensure that the oil will not cause an engine to experience a pumping failure during cold weather conditions. The test is commonly referred to as the TP1-MRV test, ASTM D4684.

Modern gasoline engines incorporate numerous improvements to reduce engine mechanical friction, and to make engine starting easier. These changes have largely been incorporated to improve fuel economy and reduce emissions. One result of this is that now many modern engines start at very low temperatures, and this increases the risk that engine pumping failures may occur in particularly cold weather. Pumping viscosity is a measure of the fluidity of the engine lubricant at low-temperatures. If the engine oil is too viscous to flow after an engine is started, catastrophic engine damage can occur. For this reason, it is important to develop engine lubricant components which have minimal contribution to the low-temperature, low-shear-rate viscosity in the TP1-MRV and which do not cause yield stress. Thus, it is desirable that the VI improver's contribution to pumping viscosity also be minimal.

Numerous materials are used in the formulation of fully-formulated multigraded engine oils. Besides the basestocks, which may include paraffinic, napthenic, and even synthetically-derived fluids, the polymeric VI improver, and the pour point depressants, there are numerous lubricant additives added which act as antiwear agents, antirust agents, detergents, dispersants, and pour point depressants. These lubricant additives are usually combined in diluent oil and are generally referred to as a dispersant-inhibitor package, or as a "DI" package.

Common practice in the formulation of a multigrade oil is to blend to a target kinematic viscosity and cranking viscosity, which is determined by the specified SAE grade requirements in SAE J300. The DI package and pour point depressant are combined with a VI improver oil concentrate and with one basestock, or two or more basestocks having different viscosity characteristics. For example, for an SAE 10W-30 multigrade, the concentration of the DI package and the pour point depressant might be held constant, but the amounts of HVI 100 neutral and HVI 250 neutral or HVI 300 neutral basestock might be adjusted along with the VI improver until the target viscosities are achieved. For an SAE 5W-30, it is often common practice to use only one basestock such as HVI 100 neutral with the selected VI improver concentrate, DI package, and pour point depressant.

Once a formulation has been arrived at that has the targeted kinematic viscosities and cranking viscosities, the TP1-MRV viscosity is determined. A relatively low pumping viscosity and the absense of yield stress is desirable. The use of a VI improver which contributes little to low-temperature pumping viscosity or yield stress is very desirable in the formulation of multigrade oils; it minimizes the risk of formulating an oil that may cause an engine pumping failure and it provides the user with additional flexibility in the use of other components which contribute to pumping viscosity.

When multigrade engine lubricants are manufactured, the VI improver is introduced in an oil concentrate. The VI improver is dissolved into basestock, such as HVI 100 neutral, before use. In some instances, the lubricant manufacturer may not have concentrate dissolving facilities, so the oil concentrate must be transported to the user as a concentrate rather than as a solid. To minimize transportation and storage costs, however, it is advantageous to be able to transport a VI improver oil concentrate that contains a high percentage of dissolved polymer. Thus, for two polymers that provide equivalent viscosities in multigrade oils, the one which can be handled at a higher concentration in an oil concentrate will be preferred. More polymer is dissolved in the concentrate and transportation and storage costs are minimized. It is also advantageous to dissolve the polymer in oil quickly, and at relatively low temperatures; this minimizes concentrate blend facility temperature requirements, and improves throughput.

The limitation on the amount of polymer that can be used in a VI improver concentrate is dependent on the concentrate's viscosity at storage and handling temperatures. Sufficient fluidity must be maintained so that the concentrate can be readily pumped from the storage vessel into the oil blending vessel. The amount of polymer that can be added to a concentrate to ensure handleability can be determined by measuring the low-shear rate viscosity of the oil concentrate.

Engine power losses are generally reduced when viscous friction is reduced through a reduction in an engine lubricant's HTHSR viscosity. This manifests itself in improved fuel efficiency. However, to ensure adequate engine journal bearing protection, minimum HTHSR viscosity limits are now included in SAE Standard J300, which defines the viscosity grading system for SAE grade designations. (The present version of the Standard is SAE J300, revision MAR93.)

One approach to the obtainment of improved fuel efficiency within a particular SAE grade is to formulate with a VI improver that contributes enough HTHSR viscosity so that the resultant engine oil is above the HTHSR viscosity minimum defined by SAE J300, but close to the minimum. Using such an approach, VI improvers such as those disclosed in U.S. Pat. No. 3,775,329 (St. Clair) offering a relatively high contribution to kinematic viscosity at 100° C. (kinematic viscosity limits are also included in SAE J300), and a relatively low contribution to HTHSR viscosity are preferred. Two polymers representative of this prior art are given in examples 6c and 12c of this document. U.S. Pat. No. 3,772,196, which is incorporated by reference herein, discloses linear block copolymers of styrene (S) and hydrogenated polyisoprene (EP), having the structure S-EP.

In comparison to the S-EP polymers, a different balance between thickening efficiency, and HTHSR viscosity has been achieved with linear triblock copolymers of styrene (S) and hydrogenated isoprene (EP) having the block structure EP-S-EP as described in U.S. Pat. No. 4,788,361, which is incorporated by reference herein. However, the EP-S-EP copolymers provide substantially higher HTHSR viscosities than the S-EP copolymers of U.S. Pat. No. 3,775,329. For fuel economy savings, however, the S-EP polymers are preferred, provided that their HTHSR viscosity contributions are sufficient to meet SAE J300 requirements. The EP-S-EP polymers described in U.S. Pat. No. 4,788,361 are illustrated by symmetric polymers although the patent places no limitations on the relative sizes of the first and second EP blocks.

SUMMARY OF THE INVENTION

The present invention includes asymmetric triblock copolymers useful as viscosity index improvers in oil compositions. The triblock copolymers have the block structure hydrogenated polyisoprene-polystyrene-hydrogenated polyisoprene (EP-S-EP) wherein the first EP block has a number average molecular weight at least 4 times greater than the number average molecular weight of the second EP block. The difference in EP block sizes significantly reduces the HTHSR viscosity of oil compositions in comparison to EP-S-EP block copolymers having similarly sized EP number average molecular weights. The contribution of the asymmetric triblock EP-S-EP polymers to HTHSR viscosity is comparable to that of prior art S-EP polymers, and sufficient for the making of SAE multigrade engine lubricants. The differences in EP block sizes does not adversely impact other properties needed for good performance, but facilitates dissolution of the polymer into oil to make oil concentrates which contain more polymer and are more fluid than those containing S-EP copolymers.

DETAILED DESCRIPTION OF THE INVENTION

The polymers of the present invention combine polystyrene blocks and hydrogenated polyisoprene blocks in molecules having the structure EP'-S-EP", wherein EP' is a first block of hydrogenated polyisoprene having a number average molecular weight between 40,000 and 150,000 before hydrogenation, S is a block of polystyrene having a number average molecular weight between 25,000 and 60,000, and EP" is a second block of hydrogenated polyisoprene having a number average molecular weight between 2,500 and 30,000 before hydrogenation, wherein the molecular weight ratio of EP'/EP" is at least 4.

The triblock copolymer is selectively hydrogenated to saturate at least 95% by weight of the polymerized isoprene units and less than 15% by weight of the polymerized styrene units.

The polymers of the present invention are readily produced as described in U.S. Pat. No. 4,788,361. However, the polymers of the present invention have molecular weights which are not taught by the references and are selected to obtain surprisingly improved performance as a viscosity index improver, especially in terms of their ease of blending and handleability as viscosity index oil concentrates.

The polymers of this invention which are useful as VI improvers are preferably prepared by anionically polymerizing isoprene in the presence of sec-butyllithium, adding styrene, and then more isoprene to the living polystyrene molecules to make the living block copolymer molecules, and selectively hydrogenating the polyisoprene blocks.

In general, the polymers may be selectively hydrogenated to saturate the polyisoprene blocks using any of the techniques known in the prior art to be suitable for selective hydrogenation of olefinic unsaturation over aromatic unsaturation. The hydrogenation conditions must be sufficient to hydrogenate at least 95% of the original olefinic unsaturation. Hydrogenation of aromatic unsaturation must be less than 15% to avoid reduction of the amount of polystyrene needed to give desired thickening efficiency.

In general, hydrogenation involves the use of a suitable catalyst as described in U.S. Pat. No. Re. 27,145 which is herein incorporated by reference. A mixture of nickel ethylhexanoate and triethylaluminum having 2.3 moles of aluminum per mole of nickel is preferred.

The hydrogenated polymers of this invention may be added to a variety of lubricating oils to improve viscosity index characteristics. For example, the selectively hydrogenated polymers may be added to fuel oils such as middle distillate fuels, synthetic and natural lubricating oils, crude oils and industrial oils. They may also be used in hydraulic fluids, automatic transmission fluids, and multigrade gear oils. In general, any amount of the selectively hydrogenated polymers may be blended into the oils, with amounts from about 0.05 to about 10 wt % being most common. Amounts within the range from about 0.2 to about 5 wt % are preferred.

Lubricating oil compositions prepared with the selectively hydrogenated polymers of this invention may also contain other additives such as anti-corrosive additives, antioxidants, detergents, pour point depressants, one or more additional VI improvers and the like. Typical additives which are useful in the lubricating oil composition of this invention and their description will be found in U.S. Pat. Nos. 3,772,196 and 3,835,083, the disclosure of which patents are herein incorporated by reference.

PREFERRED EMBODIMENT OF THE INVENTION

In a preferred embodiment of the present invention, the polystyrene blocks and the hydrogenated isoprene blocks are combined in molecules having the structure EP'-S-EP", wherein the first hydrogenated blocks of polyisoprene have a number average molecular weight between 50,000 and 110,000 before hydrogenation, the polystyrene blocks having a number average molecular weight between 35,000 and 50,000, the second hydrogenated blocks of polyisoprene having a number average molecular weight between 3,000 and 18,000 before hydrogenation, wherein the molecular weight ratio of EP'/EP" is between 6.0 and 25.

The polymers are selectively hydrogenated with a solution of nickel ethylhexanoate and triethylaluminum having a preferred Al/Ni molar ratio of 2.3:1 to saturate at least 98% of the isoprene units and less than 10% of the styrene units.

Having thus broadly described the present invention and the preferred embodiment, it is believed that the invention is further described by reference to the following examples. It will be appreciated, however, that the examples are presented solely for purposes of describing the invention and should not be construed as the limits of the invention.

EXAMPLE 1

In this example, a triblock copolymer of hydrogenated isoprene and styrene was prepared. In the first step of the preparation, living polyisoprene blocks were prepared by anionically polymerizing isoprene in cyclohexane. The polymerization of the isoprene was initiated by adding sec-butyllithium. The polymerization of the isoprene was completed to produce living polyisoprene blocks having a number average molecular weight of 60,900. Polystyrene blocks were then formed by adding styrene to the solution of living polyisoprene blocks. The polymerization of styrene was completed to produce polystyrene blocks having a number average molecular weight of 42,100. Polyisoprene blocks were then formed by adding isoprene to the solution of living polyisoprene-polystyrene blocks. The second polymerization of isoprene was completed to produce second polyisoprene blocks having a number average molecular weight of 9,100. The lithium sites remaining in the polymer were deactivated by adding an alcohol.

The polymer was next hydrogenated so as to saturate greater than 98% of the olefinic unsaturation originally contained in the isoprene blocks and less than 15% of the aromatic unsaturation using a catalyst prepared by combining nickel ethylhexanoate and triethylaluminum (2.3 moles of aluminum per mole of nickel). The melt viscosity of the polymer was 4.9 megapoise at 250° F. The data and results are summarized in Table 1.

EXAMPLE 2

In this example, a triblock copolymer was prepared using the procedure described in Example 1 except that the number average molecular weight of the second polyisoprene blocks was 14,300. The melt viscosity of the polymer was 3.4 megapoise at 250° F. The data and results are summarized in Table 1.

EXAMPLE 3

In this example, a triblock copolymer was prepared using the procedure described in Example 1 except that the number average molecular weight of the second polyisoprene blocks was 3,700. The data and results are summarized in Table 1.

EXAMPLE 4

(Comparison)

In this example, a diblock copolymer was prepared using the procedure described in Example 1 except that the second addition of isoprene was omitted. The melt viscosity of the polymer was 4.3 megapoise at 250° F. The data and results are summarized in Table 1.

EXAMPLE 5

In this example, a triblock copolymer was prepared using the procedure described in Example 1 except that the number average molecular weight of the first polyisoprene blocks was 60,800, the polystyrene blocks was 38,600, and the second polyisoprene blocks was 6,400. The melt viscosity of the polymer was 2.5 megapoise at 250° F. The data and results are summarized in Table 1.

EXAMPLE 6

(Comparison)

In this example, a diblock copolymer was prepared using the procedure described in Example 1 except that the number average molecular weight of the first polyisoprene blocks was 62,000, the polystyrene blocks was 36,000, and the second addition of isoprene was omitted. The melt viscosity was 1.7 megapoise at 250° C. Compositional data are summarized in Table 1.

EXAMPLE 7

(Comparison)

In this example, a triblock copolymer was prepared using the procedure described in Example 1 except that the number average molecular weight of the first polyisoprene blocks was 66,100, the polystyrene blocks was 33,100, and the second polyisoprene blocks was 68,600. The melt viscosity of the polymer was 2.4 megapoise at 250° F. Compositional data and melt viscosity results are summarized in Table 1.

EXAMPLE 8

In this example, a triblock copolymer was prepared using the procedure described in Example 1 except that the number average molecular weight of the first polyisoprene blocks was 106,700, the polystyrene blocks was 49,100, and the second polyisoprene blocks was 14,100. The melt viscosity of the polymer was 5 megapoise at 250° F. Compositional data and melt viscosity results are summarized in Table 1.

EXAMPLE 9

In this example, a triblock copolymer was prepared using the procedure described in Example 8 except that the number average molecular weight of the second polyisoprene blocks was 19,000. The melt viscosity of the polymer was 4.4 megapoise at 250° F. Compositional data and melt viscosity results are summarized in Table 1.

EXAMPLE 10

In this example, a triblock copolymer was prepared using the procedure described in Example 8 except that the number average molecular weight of the second polyisoprene blocks was 5,900. Compositional data are summarized in Table 1.

EXAMPLE 11

(Comparison)

In this example, a diblock copolymer was prepared using the procedure described in Example 8 except that the second addition of isoprene was omitted. The melt viscosity was 5.2 megapoise at 250° C. Compositional data are summarized in Table 1.

EXAMPLE 12

(Comparison)

In this example, a diblock copolymer was prepared using the procedure described in Example 1 except that the number average molecular weight of the first polyisoprene blocks was 106,000, the polystyrene blocks was 44,000, and the second addition of isoprene was omitted. The melt viscosity was 2.6 megapoise at 250° C. Compositional data are summarized in Table 1.

EXAMPLE 13

(Comparison)

In this example, a triblock copolymer was prepared using the procedure described in Example 1 except that the number average molecular weight of the first polyisoprene blocks was 57,900, the polystyrene blocks was 47,000, and the second polyisoprene blocks was 55,000. Compositional data are summarized in Table 1.

EXAMPLES 14–26

In these examples the polymers produced in Examples 1–13 were used as VI improvers in a SAE 10W-40 multigrade lubricating oil composition. The basestock used in the preparation of the multigrade lubricating oil composition was a blend of an HVI 100N oil and an HVI 250N oil. The amount of each VI improver was varied so as to provide a lubricating oil composition having a kinematic viscosity of 14 centistokes (cst) at 100° C. [The multigrade lubricating oil compositions prepared in these examples contained 8.5% by weight of HVI 250N, 11.5 wt %

TABLE 1

| Example | Isoprene MW$_I$ | Styrene MS$_S$ | Isoprene MW$_{I'}$ | Melt Vis 250° F. M Poise |
|---|---|---|---|---|
| 1 | 60,900 | 42,100 | 9,100 | 4.9 |
| 2 | 60,900 | 42,100 | 14,300 | 3.4 |
| 3 | 60,900 | 42,100 | 3,700 | — |
| 4 c | 60,900 | 42,100 | 0 | 4.3 |
| 5 | 60,800 | 38,600 | 6,400 | 2.5 |
| 6 c | 62,000 | 36,000 | 0 | 1.7 |
| 7 c | 66,100 | 33,100 | 68,600 | 2.4 |
| 8 | 106,700 | 49,100 | 14,100 | 5 |
| 9 | 106,700 | 49,100 | 19,000 | 4.4 |
| 10 | 106,700 | 49,100 | 5,900 | — |
| 11 c | 106,700 | 49,100 | 0 | 5.2 |
| 12 c | 106,000 | 44,000 | 0 | 2.6 |
| 13 c | 57,900 | 47,000 | 55,000 | — | of a commercially available API AG quality additive package (ECA 12850), 0.5 wt % Acryloid 160, the identified polymer, and HVI 100N.] The viscosity index (VI), the cold cranking simulator (CCS) viscosity at –20° C., the engine oil pumpability (TP1) at –25° C. using the mini-rotary viscometer (ASTM D4684), and the high temperature, high shear rate (HTHSR) viscosity at 150° C. at $1\times10^6$ seconds$^{-1}$ in the tapered bearing simulator (TBS) (ASTM D4683) were determined for each oil composition.

All of these examples produced oil compositions from a concentrate of 6% by weight of the polymer in HVI 100N.

The asymmetric polymers of the invention dissolved much quicker than the comparison samples and a separate evaluation established that the asymmetric polymers readily dissolve at significantly lower temperatures than the comparison polymers. For example, the asymmetric linear polymer example 5 could be completely dissolved in oil at 175° F., whereas the S-EP polymers 4c, 6c, 11c, and 12c required a blending temperature of 240° F. for complete dissolution over a longer period of time. Also, at about 7 percent or greater polymer-in-oil concentrates, the S-EP block copolymers 6c and 12c show evidence of gellation at room temperature. At 9.3 percent weight in oil, the concentrate of the asymmetric EP-S-EP polymer example 5 is fluid with no evidence of gellation at room temperature.

The data and results for the SAE 10W-40 formulations are summarized in Table 2.

TABLE 2

| Example | Polymer Example | Polymer % Wt. | CCS,cP | TP1-MRV,P | VI | TBS, cP |
|---|---|---|---|---|---|---|
| 14 | 1 | 1.19 | 2,880 | 12.7 | 164 | 3.46 |
| 15 | 2 | 1.19 | 2,860 | 12.7 | 163 | 3.51 |
| 16 | 3 | 1.18 | 2,810 | 13.3 | 164 | 3.44 |
| 17 c | 4 c | 1.24 | 2,800 | 13.1 | 164 | 3.46 |
| 18 | 5 | 1.20 | 2,960 | 14.8 | 163 | 3.40 |
| 19 c | 6 c | 1.18 | 2,920 | 14.1 | 163 | 3.40 |
| 20 c | 7 c | 0.98 | 2,870 | 13.2 | 167 | 3.62 |
| 21 | 8 | 0.80 | 2,960 | 12.5 | 162 | 3.27 |
| 22 | 9 | 0.81 | 2,760 | 12.5 | 162 | 3.32 |
| 23 | 10 | 0.80 | 2,930 | 12.6 | 163 | 3.23 |
| 24 c | 11 c | 0.86 | 2,920 | 12.5 | 165 | 3.23 |
| 25 c | 12 c | 0.78 | 2,840 | 13.5 | 159 | 3.26 |
| 26 c | 13 c | 1.13 | 2,820 | 13.9 | 165 | 3.67 |

EXAMPLES 27–32

The fluidity of concentrates is determined by the measurement of viscosity at a low-shear-rate. When comparing polymer-in-oil concentrate viscosities, it is important to keep in mind the relative amount of the polymer that is required to achieve a specified kinematic viscosity in finished oil. For example, a 6 percent oil concentrate containing a higher molecular weight polymer such as example 12c, which requires less polymer for SAE 10W-40 multigrade example 25c, will have a higher concentrate viscosity than a 6 percent oil concentrate containing a lower molecular weight polymer such as example 6c, which requires more polymer for SAE 10W-40 multigrade example 19c.

Multigrade oil examples 14, 15, 17c, and 19c in Table 2, which contain polymer examples 1, 2, 4c, and 6c, require similar amounts of polymer. Their oil concentrate viscosities as measured in a Haake rotational viscometer at 180° F. and 10 reciprocal seconds rate-of-shear are given in examples 27–32 which are shown in Table 3.

TABLE 3

| Example | Polymer Example | Polymer, % Wt. | Haake Vis.,Poise |
|---|---|---|---|
| 27 | 1 | 6.0 | 5.4 |
| 28 | 1 | 8.0 | 12.6 |
| 29 | 2 | 6.0 | 4.8 |
| 30 | 2 | 8.0 | 16.5 |
| 31 | 4c | 6.0 | 20.3 |
| 32 | 6c | 6.0 | 19.4 |

EXAMPLES 33–39

Multigrade oil examples 21, 22, 23 and 25c in Table 2, which contain polymer examples 8, 9, 10, and 12c, require similar amounts of polymer. The oil concentrate viscosities of these polymers as measured in a Haake rotational viscometer at 180° F. and 10 reciprocal seconds rate-of-shear are given in examples 33–39 in Table 4.

TABLE 4

| Example | Polymer Example | Polymer, % Wt. | Haake Vis.,Poise |
|---|---|---|---|
| 33 | 8 | 6 | 20.7 |
| 34 | 8 | 8 | 36.3 |
| 35 | 9 | 6 | 15.2 |
| 36 | 9 | 8 | 29.0 |
| 37 | 10 | 6 | 17.8 |
| 38 | 10 | 8 | 36.1 |
| 39 | 12c | 6 | 31.6 |

What is claimed is:

1. An asymmetric triblock copolymer useful as a viscosity index (VI) improver, comprising:
   polystyrene blocks (S); and
   hydrogenated polyisoprene blocks (EP) combined with the polystyrene blocks in molecules having the structure EP'-S-EP";
   wherein EP' is first blocks of hydrogenated polyisoprene having a number average molecular weight between 40,000 and 150,000 before hydrogenation;
   S is blocks of polystyrene having a number average molecular weight between 25,000 and 60,000;
   EP" is second blocks of hydrogenated polyisoprene having a number average molecular weight between 2,500 and 30,000 before hydrogenation; and
   the molecular weight ratio of EP'/EP" is at least 4.

2. The copolymer of claim 2, wherein the molecular weight of EP' is between 50,000 and 110,000, the molecular weight of EP" is between 3,000 and 18,000, and the molecular weight ratio of EP'/EP" is between 6.0 and 25.

3. The copolymer of claim 2, wherein the molecular weight of the polystyrene block is from 35,000 to 50,000.

4. The copolymer of claim 1, wherein the EP' and EP" blocks are at least 98% hydrogenated.

5. The copolymer of claim 4, wherein less than 10% of the aromatic unsaturation is hydrogenated.

6. An oil composition comprising:
   a base oil; and
   a viscosity improving amount of an asymmetric triblock copolymer, the copolymer comprising:
     polystyrene blocks; and
     hydrogenated polyisoprene blocks combined with the polystyrene blocks in molecules having the structure EP'-S-EP";
   wherein EP' is first blocks of hydrogenated polyisoprene having a number average molecular weight between 40,000 and 150,000 before hydrogenation;
   S is blocks of polystyrene having a number average molecular weight between 25,000 and 60,000;
   EP" is second blocks of hydrogenated polyisoprene having a number average molecular weight between 2,500 and 30,000 before hydrogenation; and
   the molecular weight ratio of EP'/EP" is at least 4.

7. The oil composition of claim 6, wherein the molecular weight of EP' is between 50,000 and 110,000, the molecular weight of EP" is between 3,000 and 18,000, and the molecular weight ratio of EP'/EP" is between 6.0 and 25.

8. The oil composition of claim 7, wherein the molecular weight of the polystyrene blocks is from 35,000 to 50,000.

9. The oil composition of claim 6, wherein the EP' and EP" blocks are at least 98% hydrogenated.

10. The oil composition of claim 9, wherein less than 10% of the aromatic unsaturation is hydrogenated.

* * * * *